United States Patent
Woo et al.

(10) Patent No.: US 10,862,125 B2
(45) Date of Patent: Dec. 8, 2020

(54) ELECTRODE ACTIVE MATERIAL SLURRY AND LITHIUM SECONDARY BATTERY INCLUDING THE SAME

(71) Applicant: LG Chem, Ltd., Seoul (KR)

(72) Inventors: Kyung Hwa Woo, Daejeon (KR); Kwang Ho Jeong, Daejeon (KR); Jung Woo Yoo, Daejeon (KR); Ye Cheol Rho, Daejeon (KR); Je Young Kim, Daejeon (KR)

(73) Assignee: LG Chem, Ltd. (KR)

( * ) Notice: Subject to any disclaimer, the term of this patent is extended or adjusted under 35 U.S.C. 154(b) by 329 days.

(21) Appl. No.: 15/743,512

(22) PCT Filed: Mar. 28, 2017

(86) PCT No.: PCT/KR2017/003363
§ 371 (c)(1),
(2) Date: Jan. 10, 2018

(87) PCT Pub. No.: WO2017/171372
PCT Pub. Date: Oct. 5, 2017

(65) Prior Publication Data
US 2020/0227750 A1    Jul. 16, 2020

(30) Foreign Application Priority Data
Mar. 28, 2016 (KR) .................. 10-2016-0036734

(51) Int. Cl.
H01M 4/00      (2006.01)
H01M 4/62      (2006.01)
H01M 4/583     (2010.01)
H01M 10/0525   (2010.01)
H01M 10/0563   (2010.01)
H01M 4/02      (2006.01)

(52) U.S. Cl.
CPC .......... H01M 4/622 (2013.01); H01M 4/583 (2013.01); H01M 10/0525 (2013.01); H01M 10/0563 (2013.01); H01M 2004/027 (2013.01); H01M 2004/028 (2013.01)

(58) Field of Classification Search
CPC ...... H01M 4/587; H01M 4/133; H01M 4/622; H01B 1/12; H01B 1/24
See application file for complete search history.

(56) References Cited

U.S. PATENT DOCUMENTS

| | | | |
|---|---|---|---|
| 2009/0152509 A1* | 6/2009 | Choi | C09D 11/322 252/511 |
| 2013/0295457 A1 | 11/2013 | Xu | |
| 2014/0174896 A1 | 6/2014 | Sun | |
| 2015/0017529 A1 | 1/2015 | Koo et al. | |
| 2015/0030923 A1 | 1/2015 | Koo et al. | |
| 2015/0188137 A1* | 7/2015 | Komatsu | C01B 32/05 429/231.8 |
| 2016/0118664 A1 | 4/2016 | Sonobe | |

FOREIGN PATENT DOCUMENTS

| | | |
|---|---|---|
| CN | 102368543 A | 3/2012 |
| CN | 103891016 A | 6/2014 |
| CN | 104081568 A | 10/2014 |
| JP | 2013089422 A | 5/2013 |
| KR | 20130079166 A | 7/2013 |
| KR | 20140095804 A | 8/2014 |
| KR | 20140140980 A | 12/2014 |
| KR | 20150071451 A | 6/2015 |
| KR | 20150071453 A | 6/2015 |
| KR | 20160014597 A | 2/2016 |

OTHER PUBLICATIONS

Search report from International Application No. PCT/KR2017/003363, dated Jul. 10, 2017.
Search Report from Chinese Office Action for Application No. 2017800025299 dated Jul. 7, 2020; 2 pages.

* cited by examiner

Primary Examiner — Cynthia H Kelly
Assistant Examiner — Monique M Wills
(74) Attorney, Agent, or Firm — Lerner, David, Littenberg, Krumholz & Mentlik, LLP

(57) ABSTRACT

The present invention relates to an electrode active material slurry, which includes (a) an electrode active material, (b) a conductive agent, (c) a binder, (d) a solvent, and (e) a cellulose-based compound having a weight-average molecular weight (Mw) of 2,000,000 to 3,000,000, a degree of substitution of 1.0 to 1.2, and a viscosity (Brookfield viscometer, speed of 12 rpm) of 4,000 cps to 10,000 cps, and an electrode and a lithium secondary battery which include the same. Phase stability of the electrode active material slurry may be improved and battery characteristics may be improved by using the cellulose-based compound having molecular weight and degree of substitution within a specific range.

10 Claims, No Drawings

ELECTRODE ACTIVE MATERIAL SLURRY AND LITHIUM SECONDARY BATTERY INCLUDING THE SAME

CROSS-REFERENCE TO RELATED APPLICATIONS

This application is a national phase entry under 35 U.S.C. 371 of International Application No. PCT/KR2017/003363, filed on Mar. 28, 2017 which claims priority to Korean Patent Application No. 10-2016-0036734, filed on Mar. 28, 2016, in the Korean Intellectual Property Office, the disclosures of which are incorporated herein by reference.

TECHNICAL FIELD

The present invention relates to an electrode active material slurry, which includes a cellulose-based compound having a high molecular weight and a high degree of substitution, and an electrode and a lithium secondary battery which include the same.

BACKGROUND ART

Recently, in line with the rapid development of electronics industry and communication industry such as various information and communication technologies including mobile communication, portable electronic products and communication terminals, such as notebooks, netbooks, tablet PCs, mobile phones, smartphones, personal digital assistances (PDAs), digital cameras, and camcorders, have been widely used to meet the demand for weight reduction of electronic devices, and, thus, interests in the development of secondary batteries, as power sources of these devices, have also grown.

A lithium secondary battery typically includes a positive electrode in which a positive electrode active material layer is formed on at least one surface of a positive electrode collector, a negative electrode in which a negative electrode active material layer is formed on at least one surface of a negative electrode collector, and a separator disposed between the positive electrode and the negative electrode to electrically insulate them.

The negative electrode may be formed by directly coating the current collector with a negative electrode active material slurry, in which negative electrode active material particles and a binder are dispersed in a solvent, and drying the coated current collector, or may be formed by a method of coating a negative electrode active material slurry on a separate support, drying the coated support, and then laminating a film peeled from the support on the current collector.

Since the binder plays a role in maintaining binding between the negative electrode active material particles and the current collector as well as binding between the negative electrode active material particles during the preparation of the negative electrode, the binder has a great influence on the performance of the electrode. As the binder, a styrene-butadiene rubber (SBR), which is electrochemically stable and has an excellent effect even if it is used in a smaller amount than polyvinylidene fluoride (PVDF), has been used, and, in addition, a thickener has been used to adjust viscosity of the negative electrode active material slurry.

A cellulose-based thickener has been mainly used as the thickener.

However, with respect to a low molecular weight cellulose-based thickener, there is a limitation in that it causes phase separation of the slurry. Furthermore, in a case in which an excessive amount of the cellulose-based thickener is included, the use of the cellulose-based thickener in the process is not only easy due to an increase in the viscosity of the slurry, but an amount of the electrode active material is also reduced due to an increase in the weight ratio of the thickener to the active material, and thus, capacity of the battery is reduced.

PRIOR ART DOCUMENT

Korean Patent Application Laid-open Publication No. 10-2015-0071451
Korean Patent Application Laid-open Publication No. 10-2014-0095804

DISCLOSURE OF THE INVENTION

Technical Problem

An aspect of the present invention provides an electrode active material slurry having improved phase stability.

Another aspect of the present invention provides an electrode in which adhesion is improved by using the electrode active material slurry.

Another aspect of the present invention provides a lithium secondary battery in which capacity and rate capability are improved by including the electrode.

Technical Solution

According to an aspect of the present invention, there is provided an electrode active material slurry including:
(a) an electrode active material;
(b) a conductive agent;
(c) a binder;
(d) a solvent; and
(e) a cellulose-based compound having a weight-average molecular weight (Mw) of 2,000,000 to 3,000,000, a degree of substitution of 1.0 to 1.2, and a viscosity (Brookfield viscometer, speed of 12 rpm) of 4,000 cps to 10,000 cps.

Specifically, the weight-average molecular weight (Mw) of the cellulose-based compound may be in a range of 2,500,000 to 3,000,000.

The cellulose-based compound may include carboxymethylcellulose (CMC) or carboxyethylcellulose.

The cellulose-based compound may be included in an amount of 0.5 wt % to 2.0 wt %, for example, 0.8 wt % to 1.2 wt % based on a total weight of the electrode active material slurry.

The electrode active material may include a negative electrode active material, and the negative electrode active material may include a single material selected from the group consisting of crystalline carbon, amorphous carbon, and a carbon composite, or a mixture of two or more thereof.

A weight ratio of the cellulose-based compound to the conductive agent may be in a range of 1:0.5 to 1:2.

The binder may be included in an amount of 0.5 wt % to 3 wt % based on a total weight of the electrode active material.

The solvent may include water or an organic solvent.

According to another aspect of the present invention, there is provided an electrode including the electrode active material slurry.

The electrode may include a negative electrode.

According to another aspect of the present invention, there is provided a lithium secondary battery including a negative electrode, a positive electrode, a separator disposed between the negative electrode and the positive electrode, and an electrolyte solution, wherein, in this case, the negative electrode includes the negative electrode of the present invention.

Advantageous Effects

According to the present invention, an electrode active material slurry having improved phase stability may be prepared by using a cellulose-based compound having molecular weight, degree of substitution, and viscosity within a specific range as a thickener, and a lithium secondary battery having improved battery capacity and rate capability may be prepared by using the same.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Specifically, in an embodiment of the present invention, provided is an electrode active material slurry including:

(a) an electrode active material;
(b) a conductive agent;
(c) a binder;
(d) a solvent; and
(e) a cellulose-based compound having a weight-average molecular weight (Mw) of 2,000,000 to 3,000,000, a degree of substitution of 1.0 to 1.2, and a 1% solution viscosity (Brookfield viscometer, speed of 12 rpm) of 4,000 cps to 10,000 cps.

In a case in which a cellulose-based compound used as a conventional thickener is used with a binder and a conductive agent, since dispersion is not uniform due to a difference in specific gravity with an electrode active material, it is difficult to adjust or maintain viscosity of an electrode active material slurry with the passage of time. In a case in which an amount of a solvent is increased to address this limitation, since a solid content is relatively reduced, capacity and rate capability of a secondary battery may be reduced.

Particularly, in a case in which the cellulose-based compound is used with the conductive agent, the cellulose-based compound affects dispersibility of the conductive agent. For example, a cellulose-based compound having a low molecular weight is used with a conductive agent, since the conductive agent is agglomerated due to a low diffusion effect of the conductive agent, mixing with the active material is not uniform, and accordingly, uniform dispersibilities of the active material and the conductive agent across a surface of the electrode may not be expected.

In the present invention, a phase separation phenomenon of the electrode active material slurry may be improved by using the cellulose-based compound having molecular weight, degree of substitution, and viscosity within a specific range as a thickener, and, furthermore, phase stability of the electrode active material slurry may be improved by reducing the number of particles of the cellulose-based compound remaining without being dissolved in water. Thus, a lithium secondary battery having improved battery capacity and rate capability may be prepared.

In the electrode active material slurry according to the embodiment of the present invention, the cellulose-based compound, as a water-soluble polymer additive, may include carboxyethylcellulose or carboxymethylcellulose (CMC) represented by the following Formula 1, and may specifically include carboxymethylcellulose.

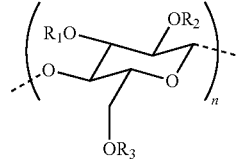

[Formula 1]

In Formula 1, $R_1$, $R_2$, and $R_3$ are each independently a hydrogen atom or —$CH_2COOH$, and n is an integer of 100 to 3,000.

Also, in addition to the carboxymethylcellulose or carboxyethylcellulose, the cellulose-based compound may be used by adding a single material selected from the group consisting of methylcellulose, ethylcellulose, hydroxyethylcellulose, benzylcellulose, and cellulose ether, or a mixture of two or more thereof.

According to an embodiment of the present invention, the weight-average molecular weight (Mw) of the cellulose-based compound may be in a range of 2,000,000 to 3,000,000, for example, 2,500,000 to 3,000,000.

The weight-average molecular weight (Mw) of the cellulose-based compound may be measured by gel permeation chromatography (GPC) against a polyacrylic acid (PAA) standard.

The molecular weight of the cellulose-based compound determines a length of a polymer chain, wherein, if the weight-average molecular weight of the cellulose-based compound is less than 2,000,000, since the viscosity is excessively low, phase separation of the electrode active material slurry, for example, sedimentation of the electrode active material, as a solid component, may occur. In a case in which an amount of the cellulose-based compound is increased to prevent this, since an amount of the electrode active material is reduced, the capacity of the secondary battery may be reduced. Also, if the weight-average molecular weight of the cellulose-based compound is greater than 3,000,000, since the viscosity is increased, solubility of the cellulose-based compound in the electrode active material slurry is reduced. Furthermore, the use of the cellulose-based compound in the process is not easy due to the increase in the viscosity of the electrode active material slurry. In a case in which the use of the solvent is increased to address this limitation, since a solid content is relatively reduced, the capacity and rate capability of the secondary battery may be reduced.

Also, the degree of substitution (DS) of the cellulose-based compound may be in a range of 1.0 to 1.2.

The expression "degree of substitution" denotes the average number of carboxymethyl groups (—$CH_2COOH$) substituted for hydroxyl groups of cellulose per cellulose repeating unit, wherein the solubility of the cellulose-based compound in water may vary depending on the degree of substitution. The degree of substitution of the cellulose-based compound may be estimated by measuring a relative amount of COOH present in a sample using a nuclear magnetic resonance (NMR) spectrometer.

In general, the solubility in water is increased when the degree of substitution of the cellulose-based compound is high, and the solubility in water is decreased when the degree of substitution is low. The solubility of the cellulose-based compound in water may eventually affect dispersion properties of the electrode active material slurry, wherein dispersibility of the electrode active material slurry may be improved as the solubility in water is higher. Also, if the dispersibility of the electrode active material slurry is improved, a slurry coating effect may be improved, and thus, productivity may be improved.

In the present invention, since the dispersibilities of the active material and the conductive agent may be improved by including the cellulose-based compound having a degree of substitution of 1.0 or more, for example, 1.0 to 1.2, the number of the particles (the number of microgels) of the cellulose-based compound remaining without being dissolved in water may be reduced. Thus, with respect to an electrode prepared by using the electrode active material slurry having improved dispersibility, a smooth current flow may be formed in the inside thereof.

In a case in which the degree of substitution of the cellulose-based compound is less than 1.0, since the solubility in water is reduced, the number of the microgels may be increased. Furthermore, the cellulose-based compound plays a role in providing electrostatic repulsion by binding with the active material and the conductive agent in the electrode active material slurry, wherein, in the case that the degree of substitution of the cellulose-based compound is less than 1.0, since such reaction is weak to reduce the dispersibilities of the active material and conductive agent, performance of the battery may be degraded. The solubility in water is increased as the degree of substitution of the cellulose-based compound is higher, but it is not technically easy to control the degree of substitution to be 1.2 or more.

Also, the number of the particles (the number of the microgels) of the cellulose-based compound without being dissolved in water, which are visually measurable and distinguishable in the electrode active material slurry, may be controlled according to the degree of substitution of the cellulose-based compound. Specifically, it is desirable that the number of the microgels may be in a range of 20 or less, for example, 5 to 20 per 0.25 ml of the electrode active material slurry. In a case in which the number of the microgels is greater than 20, the dispersibilities of the active material and conductive agent may be reduced to increase resistance of the battery, and electrode surface defects may occur due to weak cohesion.

The viscosity of the cellulose-based compound may be controlled according to the molecular weight of the cellulose-based compound, and, specifically, the viscosity of the cellulose-based compound is proportional to the molecular weight.

The viscosity of a 1% solution of the cellulose-based compound may be in a range of about 4,000 cps to about 10,000 cps.

The viscosity of a 1% aqueous solution of the cellulose-based compound may be measured using a No. 4 spindle of a Brookfield viscometer (Model: LVDV2T) at a speed of 12 rpm and room temperature.

In a case in which the 1% solution viscosity of the cellulose-based compound is less than 4,000 cps, since phase separation between the active material and the solvent occurs when the slurry is prepared, it may be difficult to perform a uniform coating process. For example, with respect to a cellulose-based compound having a weight-average molecular weight of 1,200,000, a degree of substitution of 1.2, and a viscosity of 2,200 cps, since the degree of substitution is high, the solubility in water is high, and thus, the number of the microgels is small, but, since the viscosity is low at 2,200 cps, the phase separation of the slurry occurs to reduce the stability of the slurry. In a case in which a large amount of the cellulose-based compound is added to secure processability, if the solid content is reduced, energy density of the battery may be reduced or the battery capacity may be reduced.

In contrast, in a case in which the viscosity of the cellulose-based compound is greater than 10,000 cps, since the cellulose-based compound is not dissolved in the electrode active material slurry due to an increase in the viscosity, the use of the cellulose-based compound in the process may not be possible.

In the electrode active material slurry according to the embodiment of the present invention, the cellulose-based compound may be included in an amount of 0.5 wt % to 2 wt %, for example, 0.8 wt % to 1.2 wt % based on a total weight of the solid content in the electrode active material slurry.

If the amount of the cellulose-based compound is less than 0.5 wt %, since an effect due to the use of the thickener during the electrode active material slurry coating is insignificant, the phase stability of the electrode active material slurry may not be secured, for example, the electrode active material slurry flows down. Thus, in a case in which the phase stability of the electrode active material slurry is not secured, the electrode active material slurry coating is not easy, and the binder may be unevenly distributed on the surface of the electrode during a drying process. In this case, an exfoliation phenomenon of the electrode may occur because adhesion between the active material particles and a current collector is not secured.

In contrast, in a case in which the amount of the cellulose-based compound is greater than 2 wt %, the electrode active material slurry coating is not only difficult due to the increase in the viscosity of the electrode active material slurry, but it may also be difficult to ensure high capacity of the battery because the amount of the electrode active material in the slurry is reduced.

In a case in which a low molecular weight cellulose-based compound is used with a conductive agent during the preparation of a conventional electrode active material slurry, since the diffusion effect of the conductive agent is reduced to cause the agglomeration of the conductive agent, uniform mixing with the active material may not be achieved. As a result, since the phase stability of the electrode active material slurry, in which the cellulose-based compound having low molecular weight and/or low degree of substitution is used, may not be expected, the capacity and rate capability are reduced.

In the present invention, since the electrode active material slurry, which includes the cellulose-based compound having high molecular weight and degree of substitution within a specific range, is provided, the problems in the related art may be solved. That is, since the cellulose-based compound having molecular weight and degree of substitution within a specific range has high solubility in water and excellent dispersion properties in comparison to other cellulose-based compounds having low molecular weight and/or low degree of substitution, an effect of reducing thickening and solid settling rate of the electrode active material slurry of the present invention may be achieved. Thus, since the adhesion of the electrode active material is improved to prevent the exfoliation of the electrode active material from the current collector, excellent battery performance may be achieved.

Furthermore, resistance characteristics of the battery influence output performance in the lithium secondary battery. The resistance characteristics are significantly affected by a dispersion state of components in the electrode active material slurry. For example, in a case in which the electrode active material, conductive agent, and binder are not present in a uniform dispersion state but are agglomerated together, since a channel through which a current may flow in the electrode is not formed locally, the resistance in the battery may be increased or a current concentration phenomenon may occur, and thus, it may cause the degradation of the performance and stability of the battery.

In the present invention, since the electrode active material slurry, which includes the cellulose-based compound having molecular weight and degree of substitution within a specific range, is provided, the dispersibility of the electrode active material slurry is improved, and thus, battery characteristics may be improved.

In the electrode active material slurry according to the embodiment of the present invention, the electrode active material (a) may include a negative electrode active material.

As the negative electrode active material, a carbon-based negative electrode active material, such as crystalline carbon, amorphous carbon, or a carbon composite, may be used alone or in a combination of two or more thereof, and the negative electrode active material may be the crystalline carbon, for example, graphite carbon, such as natural graphite and artificial graphite.

The negative electrode active material may be included in an amount of 60 wt % to 97 wt %, for example, 80 wt % to 97 wt % based on the total weight of the solid content in the electrode active material slurry.

Also, in the electrode active material slurry of the present invention, the conductive agent (b) is not particularly limited so long as it has conductivity without causing side reactions with other elements of the secondary battery, and, for example, a single material selected from the group consisting of natural graphite, artificial graphite, carbon black, acetylene black, Ketjen black, channel black, furnace black, lamp black, thermal black, carbon nanotubes, fullerene, carbon fibers, metal fibers, fluorocarbon, aluminum, nickel powder, zinc oxide, potassium titanate, titanium oxide, and polyphenylene derivatives, or a mixture of two or more thereof may be used.

The conductive agent may be added in an amount of about 0.05 wt % to about 3 wt % based on the total weight of the solid content in the electrode active material slurry, and a weight ratio of the cellulose-based compound to the conductive agent may be in a range of 1:0.5 to 1:2, for example, 1:0.5 to 1:1.5. In a case in which the weight ratio of the cellulose-based to the conductive agent is outside the above range, since the dispersion of the conductive agent is not smooth, an agglomeration phenomenon of the electrode slurry may occur, and it may be difficult to prepare a uniform electrode if particles are not uniformly dispersed. In addition, since an electrochemical distribution is not uniform, the resistance in the electrode may be increased or the current concentration phenomenon may occur, and thus, the performance and stability of the battery may be degraded.

Furthermore, in the electrode active material slurry of the present invention, the binder (c) is used to maintain a molded article by binding the active material particles, wherein the binder may include a single material selected from the group consisting of an acrylonitrile-butadiene rubber, a styrene-butadiene rubber (SBR), hydroxyethylcellulose, a polyvinylidene fluoride-hexafluoropropylene copolymer (PVDF-co-HFP), polyvinylidene fluoride (PVDF), polyvinyl alcohol, starch, polyacrylonitrile, hydroxypropylcellulose, regenerated cellulose, polymethylmethacrylate, polyvinylpyrrolidone, tetrafluoroethylene, polyethylene, polypropylene, polyacrylate, an ethylene-propylene-diene monomer (EPDM), a sulfonated EPDM, and polytetrafluoroethylene (PTFE), or a mixture of two or more thereof.

In this case, since a rubber-based binder selected from the group consisting of an acrylonitrile-butadiene rubber, a styrene-butadiene rubber (SBR), and an acrylic rubber, and a polymer resin, such as polyvinylidene fluoride, may be economical and environmentally friendly, may not be harmful to the health of workers, and may have binding effect larger than that of a non-aqueous binder, a ratio of the active material for the same volume may be increased. Thus, the capacity of the battery may be increased.

The binder may be included in an amount of about 0.5 wt % to about 3 wt % based on the total weight of the solid content in the electrode active material slurry. In a case in which the amount of the binder is less than 0.5 wt %, electrode adhesion may not be secured, and, in a case in which the amount of the binder is greater than 3 wt %, the electrode resistance may be increased.

The solvent (d) may include water or an organic solvent, such as N-methylpyrrolidone (NMP) and alcohol, and the solvent may be used in an amount such that the solvent has proper viscosity to dissolve and disperse the electrode active material, the binder, and the conductive agent in consideration of a coating thickness of the electrode active material slurry and manufacturing yield. For example, the solvent may be included so that a concentration of the solid content in the electrode active material slurry including the negative electrode active material, the binder, the conductive agent, and the cellulose-based compound is in a range of 50 wt % to 95 wt %, for example, 70 wt % to 90 wt %.

Also, in an embodiment of the present invention, an electrode including the electrode active material slurry may be provided, and, specifically, the electrode may include a negative electrode.

A negative electrode collector is coated with a negative electrode active material slurry, and the negative electrode may then be prepared by drying and rolling the coated negative electrode collector.

The negative electrode collector is generally prepared to a thickness of 3 μm to 500 μm. The negative electrode collector is not particularly limited as long as it has conductivity without causing adverse chemical changes in the battery, and, for example, copper, stainless steel, aluminum, nickel, titanium, fired carbon, copper or stainless steel that is surface-treated with one of carbon, nickel, titanium, or silver, or an aluminum-cadmium alloy may be used. Also, similar to a positive electrode collector, microscopic irregularities may be formed on the surface of the collector to improve the adhesion of the negative electrode active material, and the negative electrode collector may be used in various shapes such as a film, a sheet, a foil, a net, a porous body, a foam body, or a non-woven fabric body.

Furthermore, in an embodiment of the present invention, a lithium secondary battery including the electrode of the present invention is provided.

Specifically, in an embodiment of the present invention, provided is a lithium secondary battery including: a negative electrode, a positive electrode, a separator disposed between the negative electrode and the positive electrode, and an electrolyte solution, wherein the negative electrode includes the negative electrode of the present invention.

The lithium secondary battery of the present invention may be prepared by a typical method known in the art. For example, the lithium secondary battery may be prepared by disposing a porous separator between the positive electrode and the negative electrode, and injecting a non-aqueous electrolyte solution.

In this case, the positive electrode may be prepared by coating a positive electrode collector with a positive electrode active material slurry, in which a positive electrode active material as well as selectively a conductive agent and a binder is mixed with a predetermined solvent, and then drying and rolling the coated positive electrode collector.

The positive electrode collector is generally prepared to a thickness of 3 μm to 500 μm. The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

Microscopic irregularities may be formed on the surface of the positive electrode collector to improve the adhesion of the positive electrode active material, and the positive electrode collector may have various shapes such as a film, a sheet, a foil, a net, a porous body, a foam body, and a non-woven fabric body.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. Specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-Z}Ni_ZO_4$ (where $0<Z<2$), etc.), lithium-nickel-cobalt-based oxide (e.g., $LiNi_{1-Y1}Co_{Y1}O_2$ (where $0<Y1<1$), lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$), etc.), lithium-nickel-manganese-cobalt-based oxide (e.g., $Li(Ni_pCo_qMn_{r1})O_2$ (where $0<p<1$, $0<q<1$, $0<r1<1$, and $p+q+r1=1$) or $Li(Ni_{p1}Co_{q1}Mn_{r2})O_4$ (where $0<p1<2$, $0<q1<2$, $0<r2<2$, and $p1+q1+r2=2$), etc.), or lithium-nickel-cobalt-transition metal (M) oxide (e.g., $Li(Ni_{p2}Co_{q2}Mn_{r3}M_{s2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $0<S2<1$, and $p2+q2+r3+S2=1$), etc.), and any one thereof or a compound of two or more thereof may be included. Among these materials, in terms of the improvement of the capacity characteristics and stability of the battery, the lithium composite metal oxide may include $LiCoO_2$, $LiMnO_2$, $LiNiO_2$, lithium nickel manganese cobalt oxide (e.g., $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$), or lithium nickel cobalt aluminum oxide (e.g., $LiNi_{0.8}Co_{0.15}Al_{0.05}O_2$, etc.). In consideration of a significant improvement due to the control of type and content ratio of elements constituting the lithium composite metal oxide, the lithium composite metal oxide may include $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$, and any one thereof or a mixture of two or more thereof may be used.

The positive electrode active material may be included in an amount of 80 wt % to 99 wt % based on a total weight of solid content in the positive electrode active material slurry.

The conductive agent is commonly added in an amount of 1 wt % to 30 wt % based on the total weight of the solid content in the positive electrode active material slurry.

Any conductive agent may be used without particular limitation so long as it has suitable conductivity without causing adverse chemical changes in the battery, and, for example, a conductive material such as: graphite; a carbon-based material such as carbon black, acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used. Specific examples of a commercial conductive agent may include acetylene black-based products (Chevron Chemical Company, Denka black (Denka Singapore Private Limited), or Gulf Oil Company), Ketjen black, ethylene carbonate (EC)-based products (Armak Company), Vulcan XC-72 (Cabot Company), and Super P (Timcal Graphite & Carbon).

The binder is a component that assists in the binding between the active material and the conductive agent and in the binding with the current collector, wherein the binder is commonly added in an amount of 1 wt % to 30 wt % based on the total weight of the solid content in the positive electrode active material slurry. Examples of the binder may be polyvinylidene fluoride, polyvinyl alcohol, starch, regenerated cellulose, polyvinylpyrrolidone, tetrafluoroethylene, polyethylene, polypropylene, an ethylene-propylene-diene terpolymer (EPDM), a sulfonated EPDM, a styrene-butadiene rubber, a fluoro rubber, and various copolymers.

The solvent may include an organic solvent, such as N-methyl-2-pyrrolidone (NMP), and may be used in an amount such that desirable viscosity is obtained when the positive electrode active material as well as selectively the binder and the conductive agent is included. For example, the solvent may be included so that a concentration of the solid content in the positive electrode active material slurry is in a range of 50 wt % to 95 wt %, for example, 70 wt % to 90 wt %.

Also, the separator may include a porous polymer film, for example, a porous polymer film prepared from a polyolefin-based polymer, such as an ethylene homopolymer, a propylene homopolymer, an ethylene/butadiene copolymer, an ethylene/hexene copolymer, and an ethylene/methacrylate copolymer, alone or a laminate of two or more thereof. In addition, a typical porous nonwoven fabric, for example, a nonwoven fabric formed of high melting point glass fibers or polyethylene terephthalate fibers may be used, but the present invention is not limited thereto.

A lithium salt, which may be included in the non-aqueous electrolyte used in the present invention, may be used without limitation so long as it is typically used in an electrolyte solution for a lithium secondary battery. For example, any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(F_2SO_2)_2N^-$, $CF_3CF_2(CF_3)_2CO^-$, $(CF_3SO_2)_2CH^-$, $CF_3(CF_2)_7SO_3^-$, $CF_3CO_2^-$, $CH_3CO_2^-$, $SCN^-$, and $(CF_3CF_2SO_2)_2N^-$ may be used as an anion of the lithium salt.

Furthermore, the lithium secondary battery according to the embodiment of the present invention may include all types of typical lithium secondary batteries such as a lithium metal secondary battery, a lithium ion secondary battery, a lithium polymer secondary battery, or a lithium ion polymer secondary battery.

A shape of the lithium secondary battery of the present invention is not particularly limited, but a cylindrical type using a can, a prismatic type, a pouch type, or a coin type may be used.

The lithium secondary battery of the present invention may be used as power sources of various electronic products. For example, the lithium secondary battery of the present invention may be used in portable phones, mobile phones, game consoles, portable televisions, notebook computers, and calculators, but the present invention is not limited thereto.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

EXAMPLES

I. Preparation of Solution of Cellulose-based Compound

Preparation Examples 1 to 6 and Comparative Examples 1 to 3

1 g of carboxymethylcellulose (manufactured by Nippon Paper Chemicals Co., Ltd.) having molecular weight and degree of substitution as listed in the following Table 1 was dissolved in 99 g of water to prepare a 1% solution of carboxymethylcellulose.

Viscosity of the prepared 1% solution of carboxymethylcellulose and the number of particles (microgels) of the cellulose-based compound remaining without being dissolved in water in the solution were measured, and the results thereof are presented in the following Table 1. In this case, the viscosity was measured using a No. 4 spindle of a Brookfield viscometer (Model: LVDV2T) at a shear rate of 12 rpm and 25° C.

TABLE 1

|  | Molecular weight (Mw) | Degree of substitution | Viscosity (cps) | The number of particles (microgels) of the cellulose-based compound remaining without being dissolved in water (number) |
|---|---|---|---|---|
| Preparation Example 1 | 2,000,000 | 1.2 | 4,000 | 10 |
| Preparation Example 2 | 2,000,000 | 1.0 | 4,000 | 20 |
| Preparation Example 3 | 3,000,000 | 1.2 | 10,000 | 20 |

TABLE 1-continued

|  | Molecular weight (Mw) | Degree of substitution | Viscosity (cps) | The number of particles (microgels) of the cellulose-based compound remaining without being dissolved in water (number) |
|---|---|---|---|---|
| Preparation Example 4 | 3,000,000 | 1.0 | 10,000 | 20 |
| Preparation Example 5 | 2,500,000 | 1.2 | 6,000 | 15 |
| Preparation Example 6 | 2,800,000 | 1.0 | 8,000 | 20 |
| Comparative Example 1 | 2,000,000 | 0.8 | 4,000 | 70 |
| Comparative Example 2 | 3,000,000 | 0.8 | 10,000 | 200 |
| Comparative Example 3 | 1,200,000 | 1.2 | 2,200 | 5 |

As confirmed in Table 1, with respect to Preparation Examples 1 to 6 which included the carboxymethylcellulose having a weight-average molecular weight of 2,000,000 to 3,000,000, a degree of substitution of 1.0 to 1.2, and an average 1% solution viscosity of about 4,000 cps to 10,000 cps, it may be understood that the number of microgels was small at about 20 or less.

In contrast, with respect to the solutions including the carboxymethylcellulose having a low degree of substitution of 0.8 as in Comparative Examples 1 and 2, it may be understood that the numbers of microgels in the solutions were large at 70 and 200, respectively, due to the reduction of solubility.

With respect to the solution including the carboxymethylcellulose having a weight-average molecular weight of 1,200,000 and a degree of substitution of 1.2 as in Comparative Example 3, it may be confirmed that the number of microgels was low due to the high degree of substitution, but 1% solution viscosity was low at 2,200 cps due to the low molecular weight.

II. Negative Electrode Active Material Slurry Preparation

Example 1

A negative electrode active material, in which spherical artificial graphite and flaky natural graphite were mixed in a weight ratio of 9:1, graphite as a conductive agent, a styrene-butadiene rubber (SBR) as a binder, and the carboxymethylcellulose (molecular weight of 2,000,000, degree of substitution of 1.2, and 1% solution viscosity of 4,000 cps) used in Preparation Example 1 were mixed in a weight ratio of 96.5:1.5:0.8:1.2, and a negative electrode active material slurry was prepared by adding water ($H_2O$) thereto so that a concentration of solid content in the slurry was 85 wt %.

Example 2

A negative electrode active material slurry was prepared in the same manner as in Example 1 except that the ratio of the binder:the carboxymethylcellulose was changed to 1.2:0.8 in Example 1.

Example 3

A negative electrode active material slurry was prepared in the same manner as in Example 1 except that the carboxymethylcellulose (molecular weight of 3,000,000, degree of substitution of 1.0, and 1% solution viscosity of 10,000 cps) used in Preparation Example 4 was used instead of the carboxymethylcellulose compound used in Example 1.

Example 4

A negative electrode active material slurry was prepared in the same manner as in Example 3 except that the ratio of the binder:the carboxymethylcellulose was changed to 1.2:0.8 in Example 3.

Example 5

A negative electrode active material slurry was prepared in the same manner as in Example 1 except that the carboxymethylcellulose (molecular weight of 2,500,000, degree of substitution of 1.2, and 1% solution viscosity of 6,000 cps) used in Preparation Example 5 was used instead of the carboxymethylcellulose used in Example 1.

Example 6

A negative electrode active material slurry was prepared in the same manner as in Example 1 except that the carboxymethylcellulose (molecular weight of 2,800,000, degree of substitution of 1.0, and 1% solution viscosity of 8,000 cps) used in Preparation Example 6 was used instead of the carboxymethylcellulose used in Example 1.

Comparative Example 4

A negative electrode active material slurry was prepared in the same manner as in Example 1 except that the carboxymethylcellulose (molecular weight of 2,000,000, degree of substitution of 0.8, and 1% solution viscosity of 4,000 cps) of Comparative Example 1 was used instead of the carboxymethylcellulose used in Example 1.

Comparative Example 5

A negative electrode active material slurry was prepared in the same manner as in Example 1 except that the carboxymethylcellulose (molecular weight of 3,000,000, degree of substitution of 0.8, and 1% solution viscosity of 10,000 cps) used in Comparative Example 2 was used instead of the carboxymethylcellulose used in Example 1.

Comparative Example 6

A negative electrode active material slurry was prepared in the same manner as in Example 1 except that the carboxymethylcellulose (molecular weight of 1,200,000, degree of substitution of 1.2, and 1% solution viscosity of 2,200 cps) used in Comparative Example 3 was used instead of the carboxymethylcellulose used in Example 1.

Comparative Example 7

A negative electrode active material slurry was prepared in the same manner as in Comparative Example 6 except that the ratio of the negative electrode active material:the conductive agent:the binder:the carboxymethylcellulose was changed to 94.5:1.8:1.5:2.2 in Comparative Example 6.

Comparative Example 8

A negative electrode active material slurry was prepared in the same manner as in Example 1 except that the ratio of the negative electrode active material:the conductive agent:the binder:the carboxymethylcellulose was changed to 94.5:1.8:1.5:2.2 in Example 1.

III. Electrode and Secondary Battery Preparation

Example 7

(Negative Electrode Preparation)
After a copper (Cu) thin film, as a negative electrode collector, was coated with the negative electrode active material slurry prepared in Example 1 and dried, roll press was performed to prepare a negative electrode having a thickness of 10 μm.
(Secondary Battery Preparation)
A Li metal was used as a counter electrode, a polyolefin separator was disposed between the negative electrode and the Li metal, and a coin-type lithium secondary battery was then prepared by injecting an electrolyte in which 1 M $LiPF_6$ was dissolved in a solvent prepared by mixing ethylene carbonate (EC) and diethyl carbonate (DEC) at a volume ratio of 30:70.

Example 8

A negative electrode and a coin-type lithium secondary battery including the same were prepared in the same manner as in Example 7 except that the negative electrode active material slurry prepared in Example 2 was used instead of the negative electrode active material slurry prepared in Example 1.

Example 9

A negative electrode and a coin-type lithium secondary battery including the same were prepared in the same manner as in Example 7 except that the negative electrode active material slurry prepared in Example 5 was used instead of the negative electrode active material slurry prepared in Example 1.

Example 10

A negative electrode and a coin-type lithium secondary battery including the same were prepared in the same manner as in Example 7 except that the negative electrode active material slurry prepared in Example 6 was used instead of the negative electrode active material slurry prepared in Example 1.

Comparative Example 9

A negative electrode and a coin-type lithium secondary battery including the same were prepared in the same manner as in Example 7 except that the negative electrode active material slurry prepared in Comparative Example 5 was used instead of the negative electrode active material slurry prepared in Example 1.

Comparative Example 10

A negative electrode and a coin-type lithium secondary battery including the same were prepared in the same manner as in Comparative Example 9 except that the negative electrode active material slurry prepared in Comparative Example 6 was used instead of the negative electrode active material slurry prepared in Comparative Example 5.

Comparative Example 11

A negative electrode and a coin-type lithium secondary battery including the same were prepared in the same manner as in Comparative Example 9 except that the negative electrode active material slurry prepared in Comparative Example 7 was used instead of the negative electrode active material slurry prepared in Comparative Example 5.

Comparative Example 12

A negative electrode and a coin-type lithium secondary battery including the same were prepared in the same manner as in Comparative Example 9 except that the negative electrode active material slurry prepared in Comparative Example 8 was used instead of the negative electrode active material slurry prepared in Comparative Example 5

EXPERIMENTAL EXAMPLES

Experimental Example 1

Phase Stability Experiment of Negative Electrode Active Material Slurry

Average particle diameters of solid contents in the negative electrode active material slurries prepared in Examples 1 to 6 and the negative electrode active material slurries prepared in Comparative Examples 4 to 8 were measured using a grind gauge (manufacturer: SHEEN/SB, Range: 0-100 μm) method, and the results thereof are presented in Table 2 below.

Subsequently, 50 g of each of the negative electrode active material slurries of Examples 1 to 6 and the negative electrode active material slurries of Comparative Examples 4 to 8 was put in each of eleven 50 ml bottles, and a height of an amount sedimented at the bottom (settling rate %) was measured based on 100% height of the negative electrode active material slurry after three days. The results thereof are presented in Table 2 below.

TABLE 2

| | Carboxymethylcellulose | | Negative electrode active material slurry | | |
|---|---|---|---|---|---|
| | | | Weight ratio | | Average |
| | Molecular weight (Mw) | Degree of substitution | (%) of active material:conductive agent:binder:CMC | Settling rate (%) | particle diameter (μm) |
| Example 1 | Preparation Example 1 | 2,000,000 | 1.2 | 96.5:1.5:0.8:1.2 | 2.0 | 30 |
| Example 2 | | | | 96.5:1.5:1.2:0.8 | 3.4 | 35 |
| Example 3 | Preparation Example 4 | 3,000,000 | 1.0 | 96.5:1.5:0.8:1.2 | 1.0 | 40 |
| Example 4 | | | | 96.5:1.5:1.2:0.8 | 1.5 | 45 |
| Example 5 | Preparation Example 5 | 2,500,000 | 1.2 | 96.5:1.5:0.8:1.2 | 1.6 | 32 |
| Example 6 | Preparation Example 6 | 2,800,000 | 1.0 | 96.5:1.5:0.8:1.2 | 1.7 | 34 |
| Comparative Example 4 | Comparative Example 1 | 2,000,000 | 0.8 | 96.5:1.5:1.2:0.8 | 3.3 | 60 |
| Comparative Example 5 | Comparative Example 2 | 3,000,000 | 0.8 | 96.5:1.5:1.2:0.8 | 1.0 | 73 |
| Comparative Example 6 | Comparative Example 3 | 1,200,000 | 1.2 | 96.5:1.5:0.8:1.2 | 4.0 | 25 |
| Comparative Example 7 | | | | 94.5:1.8:1.5:2.2 | 1.0 | 23 |
| Comparative Example 8 | Preparation Example 1 | 2,000,000 | 1.0 | 94.5:1.8:1.5:2.2 | 0.5 | 30 |

As confirmed in Table 2, with respect to the negative electrode active material slurries of Examples 1 to 6 of the present invention, it may be understood that the sedimented amount based on 100% height of the negative electrode active material slurry after three days (settling rate) was in a range of 1.0% to 3.4%, and the average particle diameter of the solid content in the slurry was small at 45 μm or less.

In particular, when the negative electrode active material slurries of Examples 1 to 4 were examined, even in a case in which the carboxymethylcellulose having the same molecular weight and degree of substitution was used, it may be understood that the settling rates (2.0% and 1.0%) of the negative electrode active material slurries of Examples 1 and 3 having a high content ratio of carboxymethylcellulose were relatively lower than those (3.4% and 1.5%) of the negative electrode active material slurries of Examples 2 and 4, respectively.

In contrast, with respect to the negative electrode active material slurries of Comparative Examples 4 and 5 which included carboxymethylcellulose having a low degree of substitution of 0.8, it may be understood that, due to low solubility, the average particle diameters of the solid content in the slurry were respectively 60 μm and 73 μm, which were relatively larger than those of the negative electrode active material slurries of Examples 1 to 6.

Also, with respect to the negative electrode active material slurry of Comparative Example 6 which included carboxymethylcellulose having a low weight-average molecular weight of 1,200,000, it may be understood that, since phase separation occurred in the negative electrode active material slurry due to the low viscosity, the settling rate was increased.

With respect to the negative electrode active material slurries of Comparative Examples 7 and 8 in which an excessive amount of the carboxymethylcellulose was included, settling rates were low and average particle diameters were not significantly different from that of the negative electrode active material of the example, but, since the amount of the electrode active material was relatively reduced, it may be understood that overall performance, such as capacity characteristics, was degraded as described later.

Experimental Example 2

Measurement of Adhesion of Negative Electrode

Adhesion was measured for the negative electrodes prepared in Examples 7 to 10 and Comparative Examples 9 to 12, and the results thereof are presented in the following Table 3. In this case, the adhesion was measured according to a 180-degree peel-off method.

Experimental Example 3

Capacity and Efficiency Characteristic Test of Lithium Secondary Battery

The lithium secondary batteries prepared in Examples 7 to 10 and the lithium secondary batteries prepared in Comparative Examples 9 to 12 were charged at a constant current (CC) of 1.0 C to a voltage of 0.005 V at room temperature, and charge in the first cycle was then performed by charging the batteries at a constant voltage (CV) of 0.005 V to a current of 0.005% of 1.0 C. After the lithium secondary batteries were left standing for 20 minutes, the batteries were discharged at constant currents of 0.2 C and 1.0 C to a voltage of 1.5 V to measure discharge capacity in the first cycle. The results thereof are presented in Table 3 below.

TABLE 3

| | Negative electrode active material slurry | Adhesion (gf/15 mm) | Discharge capacity | |
|---|---|---|---|---|
| | | | 1C | Efficiency (%) |
| Example 7 | Example 1 | 25 | 5.22 | 99.3 |
| Example 8 | Example 2 | 18 | 5.33 | 99.7 |
| Example 9 | Example 5 | 27 | 5.10 | 98.9 |
| Example 10 | Example 6 | 30 | 5.05 | 98.9 |
| Comparative Example 9 | Comparative Example 5 | 10 | 5.00 | 99.0 |
| Comparative Example 10 | Comparative Example 6 | 12 | 5.01 | 98.8 |
| Comparative Example 11 | Comparative Example 7 | 26 | 4.87 | 98.8 |
| Comparative Example 12 | Comparative Example 8 | 32 | 4.78 | 98.9 |

Referring to Table 3, since the negative electrodes prepared in Examples 7 to 10 of the present invention had a high adhesion of 18 gf/15 mm or more and a high discharge capacity equal to or greater than an average of 98.9%, it may be understood that battery capacities were improved.

In contrast, with respect to the negative electrode of Comparative Example 9 using the negative electrode active material slurry of Comparative Example 5, in which the average particle diameter of the solid content in the slurry was large, and the negative electrode of Comparative Example 10 using the negative electrode active material slurry of Comparative Example 6 in which the settling rate of the slurry was high, it may be understood that the adhesions of the negative electrode were low at 12 gf/15 mm or less due to the reduction of the phase stability of the slurry, and the discharge capacities were relatively reduced in comparison to those of Examples 7 to 10.

With respect to the lithium secondary batteries of Comparative Examples 11 and 12 using the negative electrode active materials which included an excessive amount of carboxymethylcellulose, it may be understood that the adhesions of the negative electrode were high at 26 gf/15 mm or more due to the use of the excessive amount of carboxymethylcellulose, but, since the amount of the electrode active material was relatively reduced, the discharge capacities was relatively reduced in comparison to those of Examples 7 to 10.

While specific embodiments of the present invention have been described above, various applications and modifications will become readily apparent to those skilled in the art without departing from the scope of the present invention.

The invention claimed is:

1. An electrode active material slurry comprising:
   (a) an electrode active material;
   (b) a conductive agent;
   (c) a binder;
   (d) a solvent; and
   (e) a cellulose-based compound having a weight-average molecular weight (Mw) of 2,000,000 to 3,000,000, a degree of substitution of 1.0 to 1.2, and a viscosity of 4,000 cps to 10,000 cps,
   wherein the electrode active material is a negative electrode active material, and
   wherein the negative electrode active material comprises a single material selected from the group consisting of crystalline carbon, amorphous carbon, and a carbon composite, or a mixture of two or more thereof.

2. The electrode active material slurry of claim 1, wherein the cellulose-based compound comprises carboxymethylcellulose or carboxyethylcellulose.

3. The electrode active material slurry of claim 1, wherein the weight-average molecular weight (Mw) of the cellulose-based compound is in a range of 2,500,000 to 3,000,000.

4. The electrode active material slurry of claim 1, wherein the cellulose-based compound is included in an amount of 0.5 wt % to 2.0 wt % based on a total weight of the electrode active material slurry.

5. The electrode active material slurry of claim 4, wherein the cellulose-based compound is included in an amount of 0.8 wt % to 1.2 wt % based on the total weight of the electrode active material slurry.

6. The electrode active material slurry of claim 1, wherein a weight ratio of the cellulose-based compound to the conductive agent is in a range of 1:0.5 to 1:2.

7. The electrode active material slurry of claim 1, wherein the solvent comprises water or an organic solvent.

8. An electrode comprising the electrode active material slurry of claim 1.

9. The electrode of claim 8, wherein the electrode is a negative electrode.

10. A lithium secondary battery comprising:
   a negative electrode;
   a positive electrode;

a separator disposed between the negative electrode and the positive electrode; and
an electrolyte solution,
wherein the negative electrode comprises the negative electrode of claim 9.

\* \* \* \* \*